United States Patent [19]
Swanson

[11] Patent Number: 5,392,350
[45] Date of Patent: Feb. 21, 1995

[54] SUPPORT APPARATUS FOR A TRANSPORTABLE TELEPHONE

[76] Inventor: Paul J. Swanson, P.O. Box 53, Los Altos, Calif. 94023

[21] Appl. No.: 885,292

[22] Filed: May 18, 1992

[51] Int. Cl.$^6$ ............................................. H04M 1/00
[52] U.S. Cl. ..................... 379/446; 379/426; 379/454; 379/455
[58] Field of Search ................. 379/58, 446, 454, 447, 379/426, 449, 433; 455/89, 90; 361/427, 428, 429, 380, 422; 248/291, 224.2, 309.1; 439/626, 676, 699, 345

[56] References Cited

U.S. PATENT DOCUMENTS

| | | | |
|---|---|---|---|
| 3,748,409 | 7/1973 | Stokes | 379/454 |
| 4,196,319 | 4/1980 | Gates | 379/454 |
| 4,588,866 | 5/1986 | Monti . | |
| 4,772,079 | 9/1988 | Douglas et al. . | |
| 4,850,006 | 7/1989 | Sasaki et al. | 379/58 |
| 4,903,325 | 2/1990 | Yoshitake et al. | 455/89 |
| 4,993,244 | 2/1991 | Osman . | |
| 5,069,407 | 12/1991 | Williams . | |
| 5,109,411 | 4/1992 | O'Connell | 379/455 |
| 5,187,744 | 2/1993 | Richter | 379/449 |

FOREIGN PATENT DOCUMENTS

| 85949 | 4/1991 | Japan | 379/433 |
|---|---|---|---|
| 184431 | 8/1991 | Japan | 379/58 |

OTHER PUBLICATIONS

Motorol, Digital Hands Free Adapter Jan. 1989.

*Primary Examiner*—James L. Dwyer
*Assistant Examiner*—Jack Chiang
*Attorney, Agent, or Firm*—Flehr, Hohbach, Test, Albritton & Herbert

[57] ABSTRACT

A support apparatus for a transportable telephone is disclosed. The apparatus includes a receptacle for securing a transportable telephone which includes a handset and signal processing instrumentation. A support member with a first end and a second end is also provided. The first end of the support member is attached to the receptacle. The second end of the support member is attached to a slide mount. The slide mount is slidably engageable with a stationary mount. The stationary mount is directly attached to the vehicle. The slide mount, support member, and stationary mount are electrically interconnected so that the transportable telephone may be coupled to an external antenna and an external power supply.

16 Claims, 3 Drawing Sheets

SUPPORT APPARATUS FOR A TRANSPORTABLE TELEPHONE

BRIEF DESCRIPTION OF THE INVENTION

This invention generally relates to transportable telephones which may be used in vehicles. This invention more particularly relates to a support apparatus which conveniently secures transportable telephones of the type which include a handset and accompanying electronic instrumentation.

BACKGROUND OF THE INVENTION

Cellular telephones are known in the art. They are commonly used inside automobiles. The first generation of cellular telephones include a handset which an individual uses within the automobile. The handset is connected to a relatively large electronic instrumentation unit which is positioned within the trunk of the automobile. The electronic instrumentation unit handles the majority of the signal processing tasks associated with the cellular telephone. In these prior art systems the handset is a relatively small and light device which may be readily attached to the vehicle at a number of locations. The handset may be attached to the vehicle by the use of hooks or latches, which are known in the art.

As the sophistication of cellular technology grows, the cellular telephones are becoming smaller in size. In particular, modern devices are configured such that the electronic instrumentation is small enough to be placed inside the passenger compartment of an automobile. More particularly, modern cellular telephones are commonly sold as a transportable telephone unit with a handset and interconnecting signal processing instrumentation. The signal processing instrumentation typically includes an antenna and power supply.

There are a number of problems, obstacles, and difficulties associated with modern cellular telephones used within automobiles. First, the power supply has limited capacity. In addition, the antenna associated with the signal processing instrumentation is generally not as effective as an antenna which is mounted on the exterior of an automobile. Another shortcoming associated with modern cellular telephones which include a handset and interconnecting signal processing instrumentation is that they are relatively large, heavy, and awkward. Thus, traditional hooks and latches cannot be used to hold the telephones. Consequently, the telephones are simply placed on the floor of the automobile or on an empty seat. This approach is inconvenient in several ways. First, the telephone is difficult to reach in any of these positions. Moreover, the telephone may move while the car is in motion, potentially damaging the telephone and otherwise creating a hazardous condition within the car. Finally, the randomly positioned telephone has an unattractive and unprofessional appearance.

OBJECTS AND SUMMARY OF THE INVENTION

It is a general object of the present invention to provide a support apparatus which conveniently secures a transportable telephone of the type which includes a handset and accompanying electronic instrumentation.

It is another object of the present invention to provide a transportable telephone support apparatus which includes a mechanism for connecting the transportable telephone to an external power supply.

It is another object of the invention to provide a transportable telephone support apparatus which includes a mechanism for connecting the transportable telephone to an external antenna.

It is still another object of the invention to provide a transportable telephone support apparatus which may be conveniently removed from the vehicle and transferred for use in another vehicle.

It is yet another object of the invention to provide a transportable telephone support apparatus which may be positioned in a number of locations within the vehicle.

It is another object of the invention to provide a transportable telephone support apparatus which may be adjusted into a variety of positions.

These and other objects are obtained by a support apparatus for a transportable telephone in accordance with the invention. The apparatus includes a receptacle for securing a transportable telephone which includes a handset and signal processing instrumentation. A support member with a first end and a second end is also provided. The first end of the support member is attached to the receptacle. The second end of the support member is attached to a slide mount. The slide mount is slidably engageable with a stationary mount. The stationary mount is directly attached to the vehicle. The slide mount, support member, and stationary mount are electrically interconnected so that the transportable telephone may be coupled to an external antenna and an external power supply.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
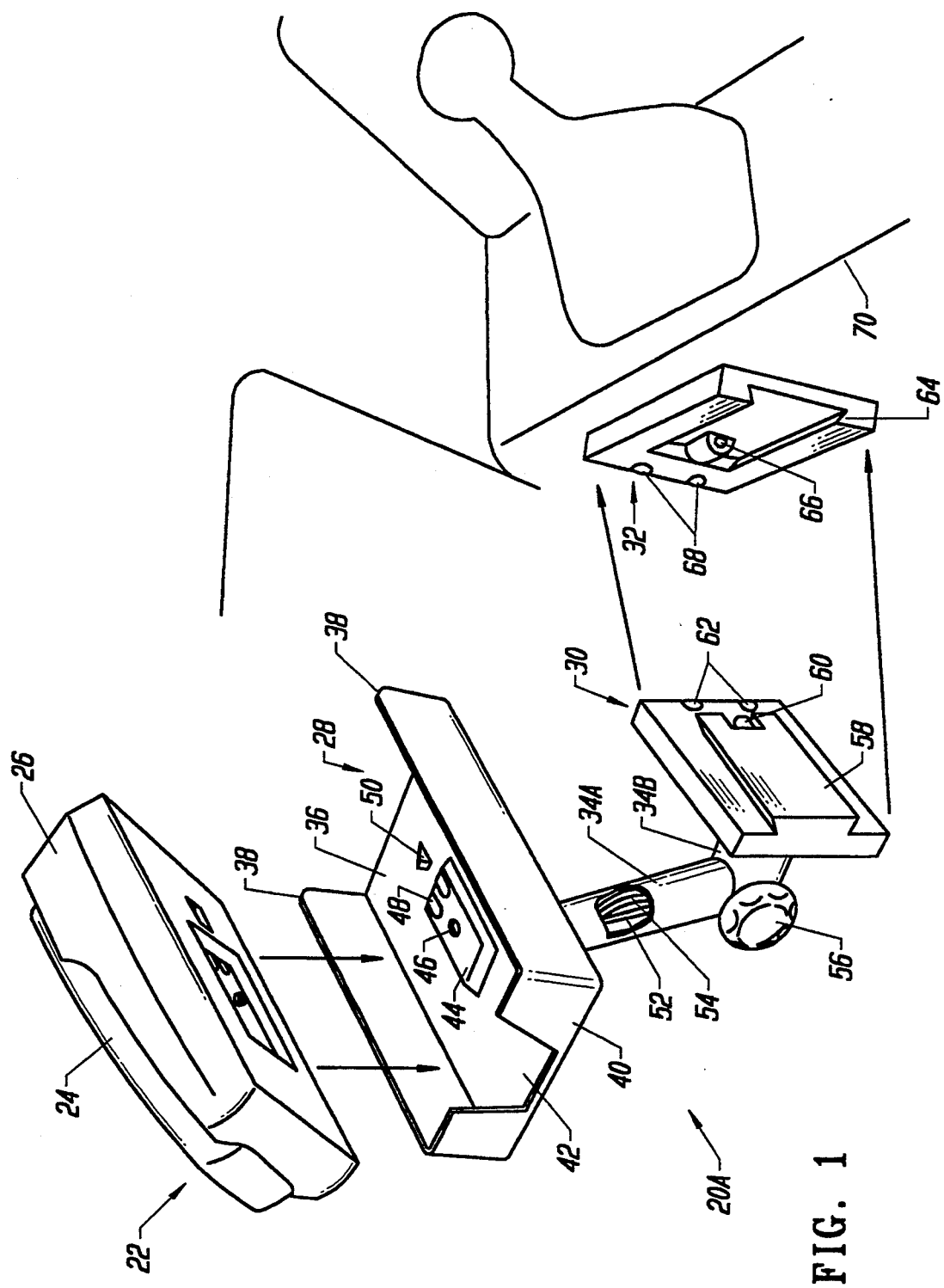
FIG. 1 is a perspective view of a side mounted transportable telephone support apparatus in accordance with the invention.

Referring to FIG. 1, a support apparatus 20A for a transportable telephone is disclosed. As used herein, the term "transportable telephone" refers to a communication apparatus including a handset and signal processing instrumentation which are designed so as to fit together as a single unit. This type of apparatus is to be distinguished from prior art devices in which the handset is used within the passenger compartment of the automobile and the electronic instrumentation is positioned within the trunk of the automobile. The support apparatus of the invention is applicable to all types of vehicles. As used herein, the term "vehicle" includes automobiles, boats, recreational vehicles, motorcycles, airplanes, and related mechanisms.

FIG. 1 depicts a transportable telephone 22 which includes handset 24 and signal processing instrumentation 26. The main components of the support apparatus 20A of the invention include a receptacle or crib 28, a slide mount 30, and a stationary mount 32. The apparatus 20A may also include one or more support members 34.

The receptacle 28 includes an elongated bed 36 which has elongated guides or side walls 38 on its outer perimeter. The elongated bed 36 also has an end guide 40 on its outer perimeter which includes a receptacle aperture 42. The receptacle aperture 42 may be used to accommodate a telephone cord or external electronic connections.

The elongated bed 36 may also include a contact platform 44. The contact platform 44 includes antenna connection 46 for coupling to an external antenna and power connections 48 for coupling to an external power supply. The bed 36 may also include an antenna trigger 50 which disconnects the internal antenna of the transportable telephone 22 and connects the telephone to an external antenna positioned outside of the vehicle. This is accomplished without physically removing the antenna associated with the transportable telephone 22.

The transportable telephone 22 is positioned within receptacle 28 and is secured therein by the elongated guides 38 and the end guide 40. The receptacle 28 may also secure the transportable telephone 22 by a latching mechanism on the bed 36. The transportable telephone 22 includes cooperating connections for receiving the antenna connection 46, the power connections 48, and the antenna trigger 50.

The support member 34A is connected to the receptacle 28. The support member 34A may carry a coaxial antenna cable 52 and power wires 54. A second support member 34B may also be provided. In this case, an adjustment knob 56 is preferably provided. The adjustment knob 56 may be of a form known in the art which allows for the positional adjustment of the support member 34A.

The slide mount 30 is coupled to the support member 34. The slide mount 30 includes a protruding member 58. The slide mount 30 also includes a slide mount antenna connection 60 and slide mount power connections 62 which are respectively coupled to coaxial antenna cable 52 and power wires 54 of the support member 34.

The support apparatus 20A also includes a stationary mount 32. The stationary mount 32 includes a track 64 for receiving the protruding member 58 of the slide mount 30. The stationary mount 32 also includes a stationary mount antenna connection 66 for coupling with the slide mount antenna connection 60, and stationary mount power connections 68 for coupling with slide mount power connections 62. The stationary mount antenna connection 66 is coupled to an external antenna (not shown) which is positioned on the outside of the vehicle. The stationary mount power connections 68 are coupled to an external power supply (not shown) such as the vehicle battery.

Figure 2:
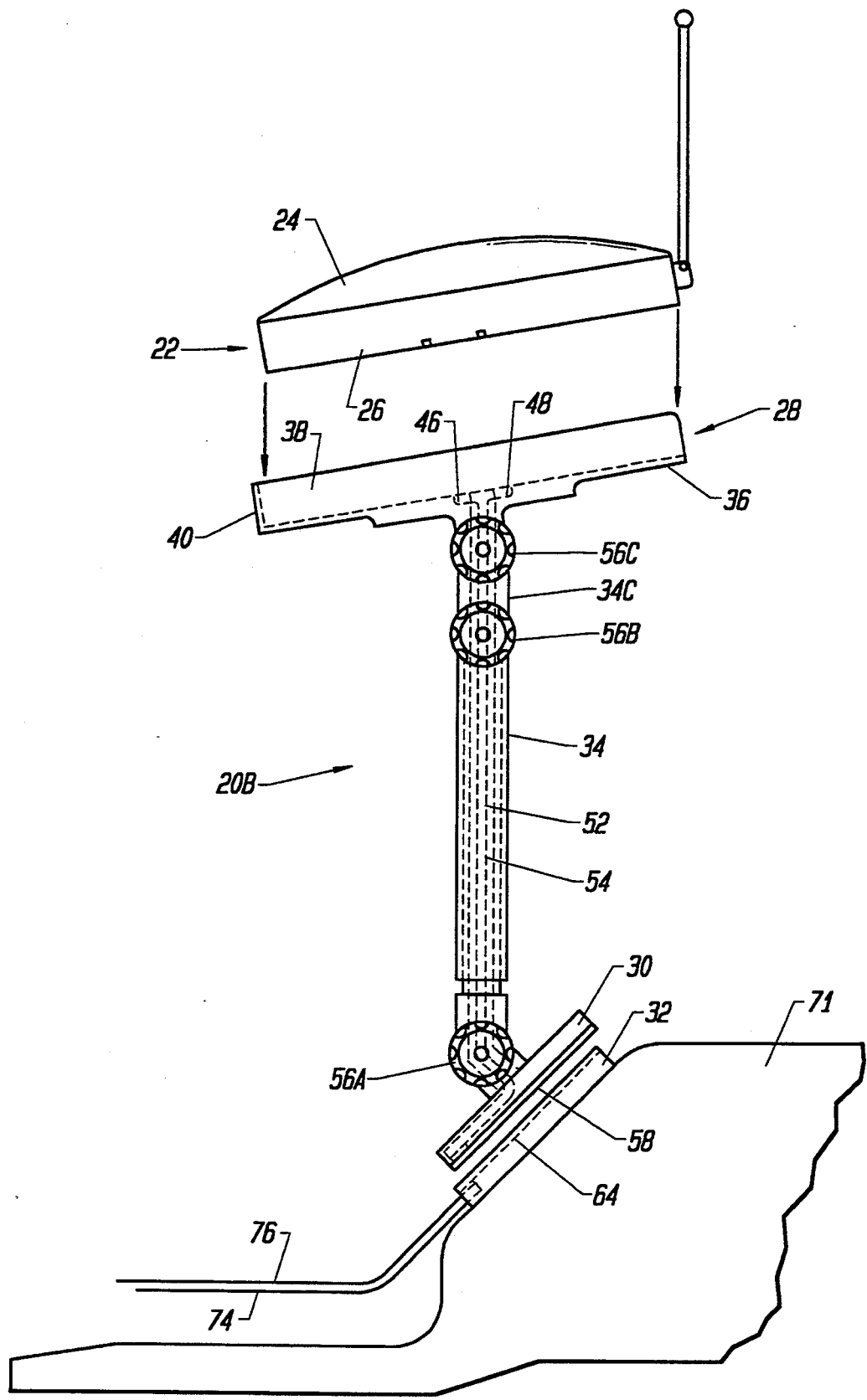
FIG. 2 is a side view of a flat mounted transportable telephone support apparatus in accordance with the invention.

In the embodiment of FIG. 1, the stationary mount 32 is in a side mount configuration, attached to a substantially vertical surface 70. FIG. 2 depicts an alternate embodiment of the support apparatus 20B in which the stationary mount 32 is in a flat mount configuration, attached to a substantially horizontal surface 71. The stationary mount 32 may be attached at practically any location which is convenient. The convenience of the location will depend on the type of vehicle involved.

It should be noted that the stationary mount 32 may be placed in a number of locations, while the slide mount 30 and receptacle 28 are moved from one location to another. For instance, one stationary mount 32 may be in an automobile, while another is in a boat. In this case, the owner can conveniently move the slide mount 30 and receptacle 38 which is holding the transportable telephone 22 from an automobile to a boat. Similarly, an automobile may have multiple stationary mount 32 locations. For instance, one inside the automobile for use during driving, and one on the outside of the automobile, for example on a bumper, if the individual is working near the automobile and wants to conveniently hear and use the telephone.

When the stationary mount 32 is located in a potentially hostile environment such as the exterior of an automobile or within a boat, it is advisable to cover the mount when it is not coupled to the slide mount 30. The cover is preferably in the same form as the slide mount, but does not include electrical contacts and is not connected to a support member 34.

FIG. 2 shows a coaxial antenna cable 74 and power lines 76 connected to the stationary mount of the support apparatus 20B. The support member 34 includes a number of adjustment knobs 56A, 56B, and 56C to accurately position the transportable telephone 22 for a given individual. For instance, adjustment knob 56A adjusts the vertical orientation angle of the support member 34. Adjustment knob 56B may adjust a support member segment 34C beneath the receptacle 28. Adjustment knob 56C may be positioned at the bottom of the receptacle 28, and thereby provide a mechanism for adjusting the angle of the receptacle 28.

Figure 3:
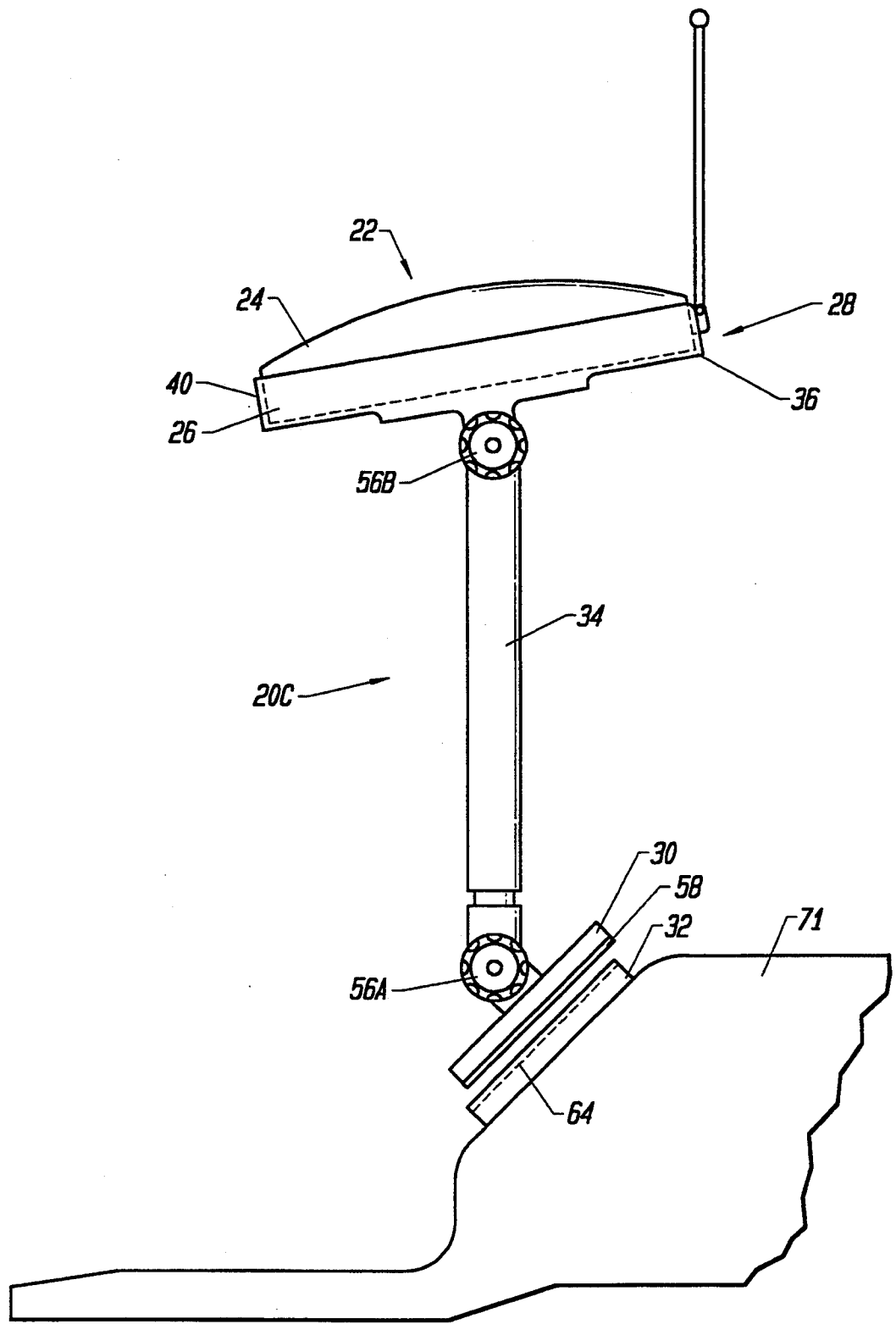
FIG. 3 is a side view of a flat mounted transportable telephone support apparatus without electrical connections.

FIG. 3 depicts an alternate embodiment of the support apparatus 20C wherein the transportable telephone 22 is positioned within the receptacle 28, but an antenna connection and power connections are not provided.

One skilled in the art will recognize other advantages associated with the invention. For instance, the antenna trigger 50 disengages the antenna associated with a portable telephone without requiring the physical removal of the antenna. The support apparatus 20 provides external connections to a power supply without necessarily relying upon the cigarette lighter within the vehicle. Most people find it inconvenient to use the cigarette lighter of a vehicle for powering an electronic device. This approach is inconvenient because the cord to the lighter is obtrusive and the lighter is no longer available for its intended purpose.

Thus, a support apparatus for conveniently securing transportable telephones is disclosed. The support apparatus includes a mechanism for connecting the transportable telephone to an external power supply and to an external antenna. Therefore, the internal power supply of the telephone does not have to be unnecessarily depleted. In addition, a stronger external antenna may be used, as opposed to relying upon the weaker antenna of the telephone. With the present invention, the relatively heavy and cumbersome transportable telephone may be conveniently positioned within the automobile. The slide mount 30 enables one to remove the support apparatus from the vehicle at the user's convenience, in order to transfer it to another vehicle or for theft prevention. The adjustment knobs used in conjunction with the support member allow the telephone to be conveniently positioned at practically any location.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An electrically interconnecting support apparatus for an electronic device, said apparatus comprising:
   a mobile mount with an extended interface surface and a support surface, said mobile mount including a set of mobile mount power contacts;
   a stationary mount including a port, said port being configured to engage said extended interface surface and thereby physically support said mobile mount, said stationary mount including a set of stationary mount power contacts coupled to an external power supply and said mobile mount power contacts;
   an elongated positionally adjustable support member with a first end and a second end, said first end being coupled to said support surface of said mobile mount, said elongated positionally adjustable support member including means for coupling said mount power contacts from said first end to said second end; and
   a crib for receiving an electronic device, said crib being attached to said second end of said elongated positionally adjustable support member, said crib including interface means for interconnecting said coupling means to said electronic device.

2. The apparatus of claim 1 wherein said extended interface surface of said mobile mount includes an extended protruding member.

3. The apparatus of claim 2 wherein said port of said stationary mount includes an extended track for receiving said extended protruding member.

4. The apparatus of claim 2 wherein said elongated positionally adjustable support member includes a first support member segment, a second support member segment, and a first adjustment mechanism positioned between said first support member segment and said second support member segment, said first adjustment mechanism being manipulable to alter the position of said first support member segment and said second support member segment.

5. The apparatus of claim 4 wherein said positionally adjustable support member further includes a third support member segment and a second adjustment mechanism, said second adjustment mechanism being positioned between said second support member segment and said third support member segment, said second adjustment mechanism being manipulable to alter the position of said second support member segment and said third support member segment.

6. The apparatus of claim 1 wherein said stationary mount is attached to a vertical surface.

7. The apparatus of claim 1 wherein said stationary mount is attached to a horizontal surface.

8. The apparatus of claim 1 wherein said crib includes:
   an elongated bed with opposing elongated sides and opposing narrow sides;
   elongated guide members respectively positioned on said opposing elongated sides; and
   an end guide positioned on at least one of said opposing narrow sides.

9. A mobile and positionally adjustable support apparatus for an electronic device, said apparatus comprising:
   a mobile mount with an extended interface surface and a support surface;
   a stationary mount including a port, said port being configured to engage said extended interface surface and thereby physically support said mobile mount, said port being further configured for manual receipt and removal of said extended interface surface of said mobile mount;
   an elongated positionally adjustable support member with a first end and a second end, said first end being coupled to said support surface of said mobile mount;
   a crib for receiving an electronic device, said crib being attached to said second end of said elongated positionally adjustable support member; and
   means for connecting said electronic device positioned within said crib to an external power supply, said connecting means being integrated into said mobile mount, said stationary mount, said positionally adjustable support member, and said crib.

10. The apparatus of claim 9 wherein said extended interface surface of said mobile mount includes an extended protruding member.

11. The apparatus of claim 10 wherein said port of said stationary mount includes an extended track for receiving said extended protruding member.

12. The apparatus of claim 9 wherein said elongated positionally adjustable support member includes a first support member segment, a second support member segment, and a first adjustment mechanism positioned between said first support member segment and said second support member segment, said first adjustment mechanism being manipulable to alter the position of said first support member segment and said second support member segment.

13. The apparatus of claim 12 wherein said positionally adjustable support member further includes a third support member segment and a second adjustment mechanism, said second adjustment mechanism being positioned between said second support member segment and said third support member segment, said second adjustment mechanism being manipulable to alter the position of said second support member segment and said third support member segment.

14. The apparatus of claim 9 said stationary mount is attached to a vertical surface.

15. The apparatus of claim 9 wherein said stationary mount is attached to a horizontal surface.

16. The apparatus of claim 9 wherein said crib includes:
   an elongated bed with opposing elongated sides and opposing narrow sides;
   elongated guide members respectively positioned on said opposing elongated sides; and
   an end guide positioned on at least one of said opposing narrow sides.

* * * * *